United States Patent

Mademann

(10) Patent No.: US 7,885,219 B2
(45) Date of Patent: Feb. 8, 2011

(54) METHOD AND MOBILE COMMUNICATION NETWORK FOR PROVIDING MULTICAST AND/OR BROADCASTING SERVICES

(75) Inventor: Frank Mademann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/274,931

(22) Filed: Nov. 20, 2008

(65) Prior Publication Data

US 2009/0067359 A1 Mar. 12, 2009

Related U.S. Application Data

(63) Continuation of application No. 10/492,692, filed as application No. PCT/DE01/04037 on Oct. 19, 2001, now Pat. No. 7,580,718.

(51) Int. Cl.
H04B 7/204 (2006.01)
(52) U.S. Cl. .................. 370/319; 370/328; 370/329; 370/331; 370/332; 370/338
(58) Field of Classification Search ............... 370/312, 370/328, 329, 331, 332, 335, 338, 351, 352, 370/401, 410
See application file for complete search history.

(56) References Cited

U.S. PATENT DOCUMENTS

| | | | |
|---|---|---|---|
| 6,104,929 A | 8/2000 | Josse et al. | |
| 6,108,519 A | 8/2000 | Nitta | 455/31.3 |
| 6,501,957 B2 | 12/2002 | Muhonen et al. | 455/503 |
| 6,618,592 B1 | 9/2003 | Vilander et al. | 455/452 |
| 6,628,946 B1 | 9/2003 | Wiberg et al. | 455/434 |
| 7,369,522 B1 * | 5/2008 | Soininen et al. | 370/328 |
| 2002/0032029 A1 * | 3/2002 | Angin | 455/428 |
| 2003/0043786 A1 | 3/2003 | Kall et al. | 370/352 |
| 2008/0219218 A1 * | 9/2008 | Rydnell et al. | 370/331 |

FOREIGN PATENT DOCUMENTS

| | | |
|---|---|---|
| EP | 1071296 | 1/2001 |
| EP | 1437015 A | 7/2004 |
| WO | 9949686 | 9/1999 |
| WO | 0051373 | 8/2000 |
| WO | 0057601 | 9/2000 |

OTHER PUBLICATIONS

Hutchison3G, "Architectural considerations for MBMS", 3GPP TSG_SA GG2, Sophia Antipolis, 27-31, Aug. 2001.

Lucent Technologies: "Support of Multicast Services"; 3 GPPP TSG-SA WG2 Meeting # 19, Sophia Antipolis, 27-31, Aug. 2001.

"Method for Multi-Casting Data Packet to Mobile Station, Gateway Node Relating Thereto, Service Node and Routing Node"; Inventor: Leroy Suresh Andre Jean-Marie et al. ; filed Mar. 23, 2001.

(Continued)

Primary Examiner—Wayne Cai
(74) Attorney, Agent, or Firm—King & Spalding L.L.P.

(57) ABSTRACT

Disclosed are methods and systems for providing multicast and/or broadcast services in a mobile communication network. In particular, the disclosed methods and systems optimize resource utilization and signaling in packet-based networks.

14 Claims, 2 Drawing Sheets

OTHER PUBLICATIONS

Von Sefan Gneiting and Wolfgang Pauler, "IP im Mobilfunk"; Funkschau, 20/99, 1999.

Al Agha et al.; "Dynamic Slot Allocation for Multicasting in GPRS Systems"; 2000 IEEE; pp. 2355-2359, 2000.

Digital cellular telecommunications system (Phase 2+) General Packet Radio Service (GPRS), Service description Stage 2 (3GPP TS 03.60 version 7 7.0 Release (1998); ETS; TS 101 344 ETS Standards, LIS. Sophia Antipolis Cedex, France, vol. 3-SA2, No. V7.7 0, (Jun. 1, 2001), p. 1-110, XP014006098 ISSN: 0000-0001; Others, 2001.

"Digital cellular telecommunications system (Phase 2+) (GSM) Universal Mobile Telecommunications System (UMTS); General Packet Radio Service (GPRS) Service description: Stage 2 (3GPP TS 23 060 version 4.1.0 Release 4): ETSI TS 128 060" Standards, ETSI Standards, LIS Sophia Antipolis Cedex, France, vol. 3-SAR, No. V4.1.0, (Jun. 1, 2010), XP014007562 ISSN: 0000-0001; Others; 2001.

Hutchison3G, "Architectural considenrations for MEIMS" 3GPP TSG_SA G32, Sophia Amtipolis Aug. 27-31, 2001, Owens, 2001.

Lucent Techonlogies, "Support of Mulicant Services", 3 GPPP TSG-SA WG2 Meeting 12, SOPHIA AMTIPOLIS 27-31. Aug. 2001: Others, 2001.

Khaldoun Al Agha et al: "Dynamic Slot Allocation for multicasting in GPRS systems" VTC 2000-Spring 2000 IEEE 51S1 Vehicular Technology Conference, New York, NY: IEEE, US, vol. 3 of 3, Conf. 51, pp. 2355-2359/ XP000968425 ISBN: 0-7803-5719-1; Others; 2000.

* cited by examiner

US 7,885,219 B2

METHOD AND MOBILE COMMUNICATION NETWORK FOR PROVIDING MULTICAST AND/OR BROADCASTING SERVICES

CLAIM FOR PRIORITY

RELATED APPLICATION

This application is a Continuation of U.S. patent application Ser. No. 10/492,692 filed Oct. 20, 2004 now U.S. Pat. No. 7,580,718, which is a national stage application of International Application No. PCT/DE01/04037, filed in the German language on Oct. 19, 2001. The contents of these applications are incorporated herein in their entirety by this reference.

FIELD OF THE INVENTION

The present invention relates to a method and a mobile communications network for provision of multicast and/or broadcast services.

BACKGROUND OF THE INVENTION

Mobile communications networks may be connected with the aid of GPRS (General Packet Radio System) or UMTS (Universal Mobile Telecommunications System) as packet-switching systems to further standard data networks which are based on the packet-switching principle, so-called packet data networks, such as the Internet. Data is in this case transported by a packet data network, for example the Internet, via a GPRS or UMTS network to a mobile communication unit (MS) using a number of standardized protocols, such as IP (Internet Protocol). The general configuration of a GPRS mobile radio network including in particular serving GPRS support nodes (SGSN) and gateway GPRS support nodes (GGSN) is known from the specialist journal "Funkschau" [Radio Show], 20/99, "IP im Mobilfunk" [IP in mobile radio]. Data coming from a public packet-switching network is transmitted by means of point-to-point connections or services (PtP services) via a GGSN to an SGSN, and from there to a mobile communication unit. In a system such as this, an SGSN has monitoring functions (relating, for example, to user mobility, user authorization, transport service monitoring, service access monitoring) and packet transport functions (such as the conversion of data between the transport tunnels to the GGSN or to the radio network). A GGSN controls the connection between a GPRS network and a packet-data-oriented external landline network, for example the Internet. A GGSN furthermore converts data packets between an external packet-switching landline network and a transport tunnel between a GGSN and SGSN.

UMTS and GSM/GPRS provide an IP multicast service which allows mobile users to receive multicast data. This multicast service is based on point-to-point connections (PtP) between a mobile communication unit (MS) and the GGSN. The multicast data comes, for example, from the mobile communications network or from a packet-oriented external landline network, for example the Internet, by means of a multicast server, for example. This multicast service does not, however, ensure efficient use of the resources available. A separate connection as far as the multicast function of the GGSN for the respective MC-IP address is set up, and the multicast service is thus produced, via point-to-point connections for each mobile communication unit (MS) which wishes to use a specific multicast service.

SUMMARY OF THE INVENTION

The invention accordingly optimizes the resource utilization and the signaling for the provision of multicast and/or broadcast services in packet-based networks.

According to the invention, this object is achieved by the methods and by the mobile communications network (described therein).

In one embodiment a method for provision of multicast (MC) and/or broadcast services for a mobile communications network which includes a radio network and a core network is provided. The method having at least the following steps:

a. transmission of multicast and/or broadcast data for a multicast service (MC) which is activated by at least one mobile communication unit, and/or for a configured broadcast service from an MC source to the at least one mobile communication unit via at least one communication node, which is arranged in the core network, using a service-specific context (MC context) which is stored in the communication node, b. control and monitoring of the transmission of the multicast data to the at least one mobile communication unit through the at least one communication node, which is arranged in the core network, using a context which is stored in the communication node and is specific for precisely that at least one mobile communication unit with reference to the activated multicast service, and/or c. broadcasting of the broadcast data for the configured broadcast service in a defined region.

The invention reduces the number of nodes required and the resources required for packet transmission of multicast and/or broadcast data. In this case, the method and the mobile communications network can be integrated well in the known UMTS and GSM/GPRS architecture. The communication node in the core network is generally an SGSN for a GSM or UMTS mobile communications network. The MC and/or broadcast services which can be provided according to the invention are in this case largely downwards-compatible to UMTS and GSM/GPRS point-to-point (PtP) IP services. This considerably simplifies the implementation of the corresponding services in the known network systems, and assists the downwards compatibility. The MC source may in this case be an MC server in an external network, or an MC server from the mobile communications network.

In one preferred embodiment of the method according to the invention, the context which is specific for the at least one mobile communication unit is additionally stored in the at least one mobile communication unit.

The form of a specific PDP context (MC PDP context) is preferably chosen for the context which is specific for the at least one mobile communication unit and is stored in the communication node. This context, which is specific for the at least one mobile communication unit with respect to the activated multicast service and is stored in the communication node that is arranged in the core network in this case preferably includes all of the parameters which are specific for the multicast service that is activated by the mobile communication unit. This includes, for example, a so-called QoS profile, or else is referred to as a service quality profile. This profile indicates the relevant quality parameter, such as the bit rate/bandwidth, packet transmission time, priorities, etc. The QoS profile indicates to the communication node that is arranged in the core network the transmission capabilities of the mobile communication unit. Furthermore, the MC PDP context contains the access point name (APN) for each multicast service which is activated by the mobile communication unit. This indicates the home network or the administrative domain to which the MC IP address of the relevant multicast service belongs. The context furthermore contains the MC IP address of the relevant MC service.

Each multicast (MC) and/or broadcast service is preferably allocated a service-specific MC-TMSI, which is based on the fundamental configuration of the known TMSI. This allows multicast and broadcast notification using existing procedures. This MC-TMSI is preferably likewise contained in the MC PDP context of the mobile communication units which make use of the service.

In one preferred embodiment of the method according to the invention, the multicast and/or broadcast data is encrypted on a service-specific basis by means of a service-specific encryption code for the transmission from the communication node to the mobile communication unit. This encryption code is likewise recorded in the MC PDP context for the at least one mobile communication unit of the mobile communication units which make use of the service, and in the service-specific context (MC context) which is stored in the communication node. The data is either encrypted directly by the MC source, or else the communication node, that is to say in general the SGSN, carries out the encryption task. In a situation where the communication node, that is to say the SGSN, carries out the encryption process, then it sends the encryption code to a mobile communication unit when the mobile communication unit activates the relevant MC service and when a general update of the MC service is carried out. The encryption code is in this case preferably transferred via individual PtP signaling channels, which are already encrypted by existing encryption mechanisms. The encryption code is preferably changed at periodic intervals. Since it is impossible to ensure that all of the mobile communication units which have activated the relevant MC service receive the new changed encryption code at the same time, the MC data for the relevant MC service is sent a number of times in parallel, but in each case encrypted using a different encryption code. The encryption process is preferably carried out on the basis of IPSec (Internet Protocol Security).

In one preferred embodiment of the method according to the invention, the at least one communication node which is arranged in the core network, that is to say in general the SGSN, carries out registration and signaling functions with respect to an activated multicast service.

In one preferred embodiment of the method according to the invention, the at least one communication node which is arranged in the core network carries out authentication and authorization functions with respect to an activated multicast service using means which are defined for point-to-point services (PtP services). In this case, the existing structure of authorization data can be used by PtP services when specific multicast services require dedicated authorizations. An MC service is activated by a mobile communication unit by means of individual signaling between the communication node and the mobile communication unit. In this case, according to the invention, extended PtP service signaling is preferably used, that is to say the multicast service is activated by an additional element, the extended NSAPI (Network Layer Service Access Point Identifier), in the signaling between the at least one mobile communication unit and the communication node. An optional signaling element, specifically an extended or MC NSAPI (Network Layer Service Access Point Identifier) is introduced in this case. This signaling element allows a greater number of PDP contexts which are set up in parallel and are limited by the value range of the NSAPI. This can be important when one MS is using two or more MC service s in parallel, since an individual NSAPI is used at least for signaling of each MC service in a mobile communication unit.

The individual signaling of an MC service by a mobile communication unit makes it possible for the communication node to authenticate the relevant mobile communication unit by means which are already defined for PtP services. Furthermore, by comparison with the corresponding authorization data for the mobile communication unit in the HLR (Home Location Register), the communication node can check whether the mobile communication unit is authorized to activate and to use the relevant MC service. The authorization data for an MC service in the HLR has the same structure as the corresponding authorization data for a PtP service. Furthermore, it is preferably possible to use the MC service with normal conventional GPRS authorization (entered in the HLR) as well. The type of authorization that is demanded for activation of a specific MC service can preferably be derived from the MC-IP address and/or from the APN of the relevant MC service. The MC-IP address and/or the APN which are/is required for authorization are/is stored in the communication node. The use of known CAMEL functionalities offers a further option for checking whether or not an MC service can be activated.

A mobile communication unit which wishes to receive MC data for an MC service preferably activates this service first, as already explained, by signaling which contains the extended or MC NSAPI. The activation of the first MC service for this mobile communication unit results in a first MC PDP context being created, which is stored in the communication node and in the mobile communication unit. As already explained, this context preferably contains all of the parameters which are specific for the relevant MC service and for the mobile communication unit. The context is linked to the mobility management (MM) for the mobile communication unit in the same way as PDP context which is used for a PtP service. For each further MC service which is activated and used by the mobile communication unit in the subsequent time, only data which is relevant for this further MC service is additionally included in the already existing MC PDP context in the MS and in the communication node which is arranged in the core network. When a specific MC service is activated for the first time in the responsibility area of the communication node, then an MC context is additionally created in the communication node, preferably containing all of the parameters which are specific for this MC service. This context preferably has a list of those mobile communication units which have activated this multicast service.

This means that it is possible to supply multicast and/or broadcast data for at least one multicast and/or broadcast service to two or more communication units (MS) at the same time by means of one and the same context (MC context), which is specific for the at least one multicast and/or broadcast service.

The at least one communication node which is arranged in the core network then preferably controls the setting-up and clearing of transmission channels in the multicast service. The communication node initiates, inter alia and for example, the IP multicast connection on the IP backbone for the relevant MC IP address.

The "configuration options" parameter, which is known from PtP services, allows the user and the mobile communication unit to provide even more information, such as the tariff for the MC service.

The described procedure in the case of the provision of MC services can also be used, with minor discrepancies, for the provision of broadcast services. In order to provide broadcast services, a so-called MC-TMSI is reserved or allocated on a service-specific basis for each broadcast service, and its configuration is essentially based on a known TMSI. Each mobile communication unit which wishes to use a specific broadcast service has to monitor the corresponding signaling channels in order to receive notifications with the MC-TMSI that is associated with the corresponding broadcast service. These MC-TMSIs may, for example, be configured in the mobile communication unit. Furthermore, an MC context which preferably includes all the service-specific parameters is created and stored on each communication node which provides the broadcast service. This MC context has, for example, the MC-TMSI that is associated with the relevant broadcast service, its IP-MC address, a service-specific QoS profile for the transmission channels between the communication node and the mobile communication units which receive the data and, finally, the region in which the broadcast service is provided, which may correspond, for example, to a list of radio cells. Only radio resources in those cells in which there are mobile communication units which wish to use the relevant broadcast service are preferably used for the provision of broadcast services.

In network structures which use Iu flexibility, it is possible for two or more communication nodes to control the same region. In this case, MC data for the same MC service may arrive at a region having two or more communication nodes at the same time. These data transmissions are coordinated by the radio network. The radio network uses the MC-TMSI that is associated with the relevant MC service to detect that notifications coming from different communication nodes originate from one and the same MC service. All the communication nodes in this case preferably use the same MC-TMSI for one specific MC service. The radio network determines the overall region in which mobile communication units which are making use of the relevant MC service are located, on the basis of the regions which are indicated in the notifications coming from the various communication nodes. It is also advantageous likewise to always select the same for a specific MC service as the encryption code in the various communication nodes. Otherwise, coordination is impossible. The encryption codes, like the MC data as well, would then be handled independently of one another and thus in parallel, which would be inefficient. In contrast to MC services, a specific broadcast service is only ever configured in one of the two or more communication nodes which control the same region. This means that there is no possibility of two or more communication nodes sending broadcast data for the same broadcast service to the same region at the same time.

As already mentioned, the method according to the invention is very largely downwards compatible with UMTS and GSM/GPRS point-to-point (PtP) IP services. In the situation where a communication node does not support MC services corresponding to the method according to the invention then, instead of this, it automatically activates a PtP service. As already mentioned, the signaling for an MC service is virtually identical to the signaling for a PtP service. A communication node which does not support the MC services described above in this case simply ignores the optional signaling element MC NSAPI, and automatically activates a PtP service. A communication node which does support the provision of the described MC services can also choose, when MC signaling arrives, whether it will activate a PtP service or an MC service. If, for example, the number of mobile communication units which are using a specific MC service is small, then it is often more efficient to activate a PtP service rather than an MC service.

If MC and/or broadcast data now have to be transferred, then transmission channels are set up between the communication node and the corresponding mobile communication units MC and/or broadcast. The activation of the transmission channels between the communication node and the mobile communication units starts as soon as the communication node has received MC and/or broadcast data from the relevant MC IP address. The communication node then sends a notification to the radio network stating the MC-TMSI of the relevant service and the region in which mobile communication units which are using the relevant service are located. In the case of a broadcast service, the communication node indicates in the notification which region is configured in the MC context for the relevant broadcast service.

After receiving a notification such as this, the radio network requests the communication node to set up one or more transmission channels between the communication node and the radio network. The radio network may, for example, in this case arrange different transmission channels for different regions. The transmission channels between the communication node and the radio network are set up using a QoS characteristic which corresponds to the QoS profile for the relevant MC or broadcast service, and is indicated in the associated MC context. This QoS profile at the same time also indicates the requirements which have been placed on the radio transmission channels, that is to say on the transmission channels to be set up between the radio network and the mobile communication units.

The radio network then sends a notification to all of the mobile communication units which are located in the region indicated by the communication node, stating the MC-TMSI for the relevant service. This notification may be carried out, for example, by the known "paging" mechanism. The "paging" is in this case preferably repeated at periodic intervals until the transmission channels have been set up between the radio network and the mobile communication units. After receiving the notification, the relevant mobile communication units wait for a certain amount of time before they themselves request that radio transmission channels be set up. If a mobile communication unit does not receive any indication of the radio transmission channels that have been set up within this time, then it requests that a radio transmission channel be activated by the radio network.

The radio network preferably sets up radio transmission channels for MC services and broadcast services only in those regions where it receives requests from mobile communication units. The radio network sends the MC and/or broadcast data received from the communication node to the mobile communication units via the corresponding radio transmission channels.

As soon as no more data is received by the communication node, it can advantageously clear the transmission channels between it and the radio network. This means that the radio network likewise clears the corresponding radio transmission channels which are involved in the data transmission.

The method according to the invention furthermore also ensures the mobility of mobile communication units when they are using MC services. If a mobile communication unit which is activated one or more MC services moves from the responsibility region of one communication node to the responsibility region of another communication node, then the continued provision of the one or more activated MC services is ensured in that the MC PDP context which is stored for the relevant mobile communication unit is transferred from the old communication node to the new communication node together with the other contexts which are specific for the mobile communication unit. The new communication node handles the MC PDP context in the same way as if the one or more MC services which are being used by that mobile communication unit have been reactivated by the mobile communication unit. If, by way of example, no MC service has yet been activated in the new communication node, then a new MC context, which is specific for that MC service, is set up. If, on the other hand, the MC service has already been provided for other mobile communication units by the new communication node, then an MC context already exists, in which the newly arriving communication unit is also included. The encryption code may be changed if necessary, and, if appropriate, this is signaled to the relevant mobile communication unit from the new communication node. Furthermore, it is possible to change the MC-TMSI which is associated with the MC service, and this is then likewise signaled to the relevant mobile communication unit. In a situation where the QoS capabilities of the mobile communication unit are not adequate to use the MC service or services via the new communication node, or where the location of the mobile communication unit is not permissible for the MC service or services, then the MC service or services for the relevant mobile communication unit is or are deactivated by the new communication node.

The present invention can also provide a mobile communications network which is suitable for carrying out the method according to the invention.

In one embodiment, a mobile communications network for provision of multicast and/or broadcast services is described. The mobile communications network includes
a. an MC source,
b. a core network,
c. a radio network with a radio interface for wire-free transmission of multicast and/or broadcast data to at least one mobile communication unit (MS),
d. a communication node which is arranged in the core network and in which in each case at least one service-specific context (MC context) is provided for controlling the transmission of the multicast and/or broadcast data for an activated multicast and/or broadcast service, which service-specific context (MC context) comprises all the service-specific parameters and, additionally in the case of a multicast service, in each case one context, which is specific for the corresponding mobile communication unit with respect to the activated multicast service, for all of the mobile communication units which have activated the multicast service, and
e. at least one communication node which is arranged in the radio network and in which notifications as well as MC and/or broadcast radio transmission channels are provided for controlling the transmission of the multicast and/or broadcast data for an activated multicast and/or a configured broadcast service.

DESCRIPTION OF THE DRAWINGS

Further advantages of the present invention will be described with reference to the following figures, in which.

DETAILED DESCRIPTION OF THE INVENTION

Figure 1:
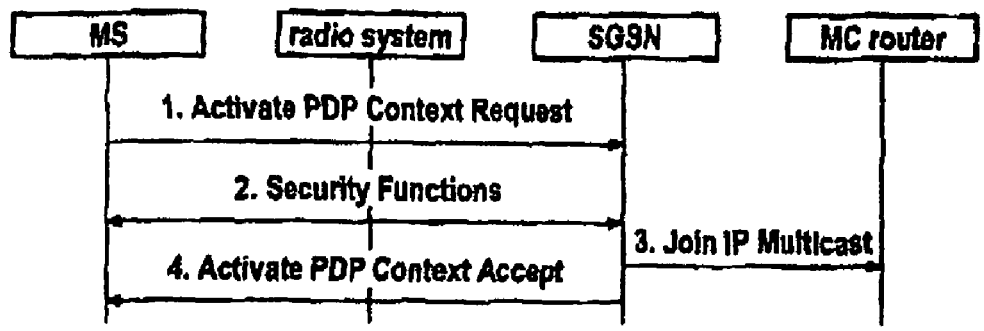
FIG. 1 shows, in the form of a block diagram, the use of methods according to the invention for the activation of an IP MC service.

FIG. 1 shows the activation of an MC service, in the form of a block diagram. The user or an application which is provided in a corresponding manner on a mobile communication unit MS initiates the use of an MC service. In a step 1 which is similar to that for activation of a PtP service, the mobile communication unit MS sends an activation request, a so-called activate PDP context request, to an associated communication node in the core network, that is to say in general to a responsible SGSN. This activate PDP context request comprises the indication of the access point name (APN), the PDP address, the QoS profile, the extended or MC NSAPI and further parameters which are defined for a PtP service. The APN indicates the home network or the administrative domain to which the MC IP address belongs. This can be used to derive an appropriate GGSN, for example if a PtP service is being activated rather than an MC service. The PDP address corresponds to the IP MC address to which the MS is to set up a connection. The QoS profile indicates the QoS capabilities of the MS. The extended or MC NSAPI corresponds to the index of the MC service within the MC PDP context.

In a similar way to that for activation of a PtP service, security measures (security functions) may be implemented in a step 2, such as the authentication of the MS.

The communication node, that is to say the SGSN, checks whether a specific authorization is required in addition to the general GPRS authorization for the requested MC service, and if the answer is yes, whether the user has the corresponding authorization. The relevant MC service may possibly demand specific QoS capabilities. If the MS cannot satisfy these QoS requirements, then the SGSN rejects the activate PDP context request. Otherwise, the SGSN creates an MC context for the relevant IP MC address, and transfers the QoS capabilities of the MS to the QoS profile of the MC context, if no MC context already exists for the relevant IP MC address in the SGSN. However, if an MC context already exists for the relevant IP MC address and the MC service does not demand any particular QoS requirements, the SGSN compares the MC QoS capabilities with the QoS profile of the MC context. Each individual parameter in the QoS profile is in this case set to the respective minimum of the corresponding QoS parameters for the MC context or for the MS QoS capabilities. In a step 3, which is referred to as "Join IP Multicast", the SGSN enters the IP MC service for the corresponding MC IP address on the IP backbone, if it is the first MS to activate this MC service. Otherwise, SGSN has already entered IP MC service for the corresponding MC IP address on the IP backbone.

In a step 4, the SGSN sends an acceptance message, a so-called activate PDP context accept, precisely in the same way as a PtP service, to the MS. This acceptance message contains the MC-TMSI for the requested MC service, the MC encryption code, the extended/MC NSAPI and further defined parameters for a PtP service. The MC-TMSI is specific for one MC service and is used to inform the MS of an MC data transfer (notification) All MS which have activated a specific MC service observe the signaling channels for notifications with the MC-TMSI of the relevant MC service.

Figure 2:
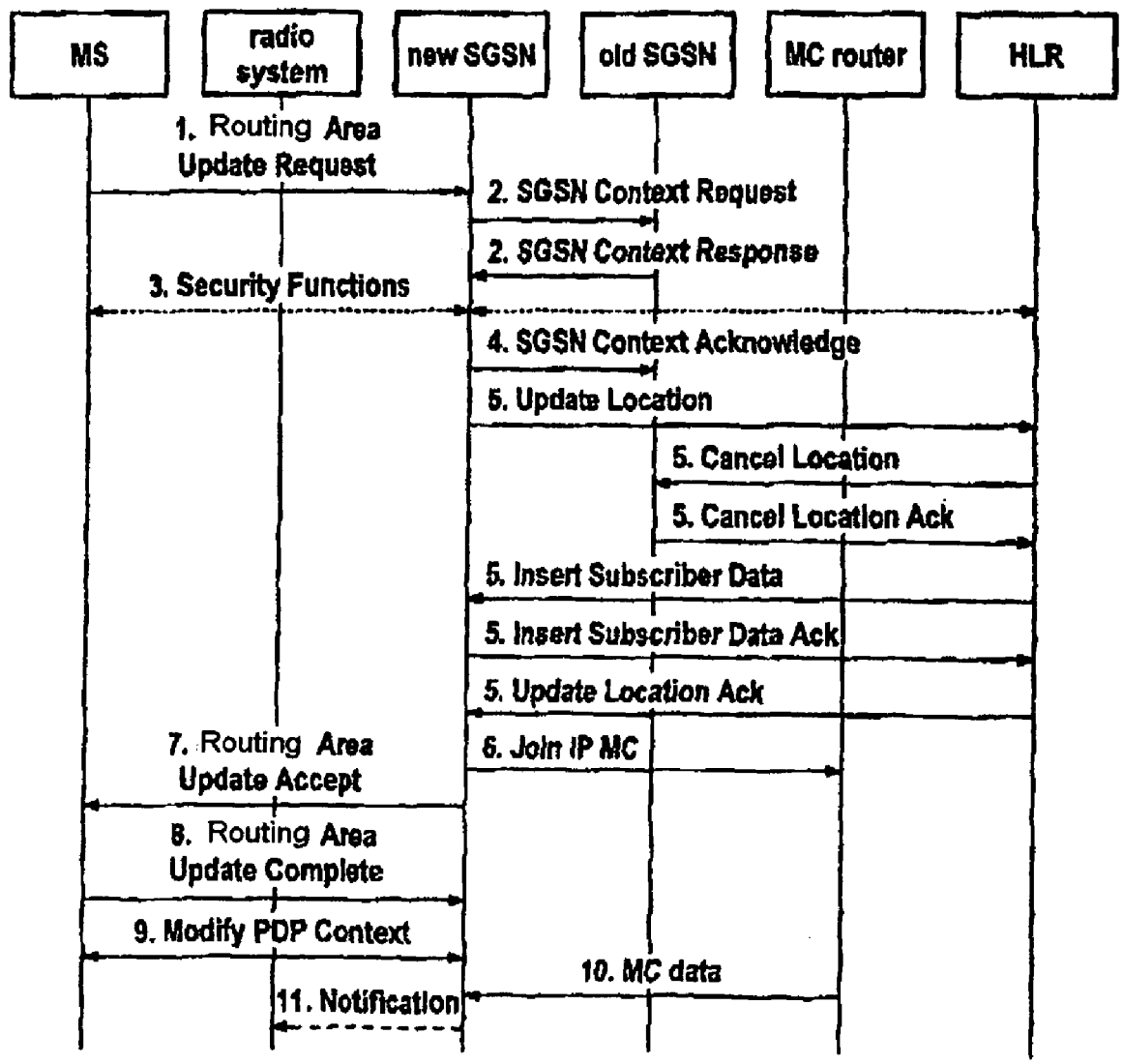
FIG. 2 shows, in the form of a block diagram, the use of methods according to the invention which ensure mobility between the communication nodes which are arranged in the core network.

FIG. 2 uses a block diagram to show the mobility between two communication nodes and between two SGSNs for the provision of MC services.

An MS is moving from the responsibility area of a first, old SGSN O to the responsibility area of a second, new SGSN N. In the process, the MS sends a request in a step 1 to the new SGSN N, in order to update the location region (routing area), a so-called "Routing Area Update Request". The new SGSN N sends a request in a step 2 to the old SGSN O and requests the contexts relating to the MS, a so-called context request. In a step 3 the old SGSN O then sends all of the contexts which are stored for this MS in a corresponding response message, the so-called context response, to the new SGSN N. Once again, security measures (security functions) are carried out by the new SGSN N in a step 4. In a step 5, the new SGSN N sends a recognition message, a so-called context acknowledge message, to the old SGSN O, in order to indicate that it has taken over control of the MS. All the measures for provision of the authorization and security data in the new SGSN N and for registration of the new SGSN N in the HLR are carried out. The new SGSN N then evaluates the presence of the MS, that is to say it checks whether the MS has any authorization at all to receive data via the new SGSN N. Furthermore, the new SGSN N checks each individual MS service which is indicated in the MC PDP context of the relevant MS. If this includes an MC service for which no MC context is yet stored in the new SGSN N, then the new SGSN N creates an appropriate MC context and enters the corresponding IP MC service on the IP backbone in step 6. If MC contexts for MC services which are listed in the MC PDP contexts for MS exist in the new SGSN N, then the new SGSN N compares the respective QoS profiles of its MC contexts with the QoS profile of the MS and, if possible, appropriately adapts the parameters. If the new SGSN N uses a different MC-TMSI for a specific MC service than the old SGSN O, or uses a different encryption code for the MC data for a specific MC service, then the new parameters for the MS are sent in a step 7. The same MC-TMSI is advantageously used for the same IP MC address in all the SGSNs. The new SGSN O can now receive corresponding MC data in a step 8. A handover or a relocation can likewise lead to a change to the SGSN. In this case, in contrast to the SGSN change described above, PtP services are also activated by the MS in parallel with the MC service. In this situation, handover/relocation signaling takes place, inter alia, between the two SGSNs. In this case, the old SGSN O sends the PDP contexts of the MS to the new SGSN N, in order that the new SGSN N can check whether it can continue these services and has the necessary resources. In this way, the new SGSN N also receives the MC PDP context for the MS. If the new SGSN N has accepted the handover or the relocation, it evaluates the MC PDP context and carries out the necessary actions with respect to MC services.

Figure 3:
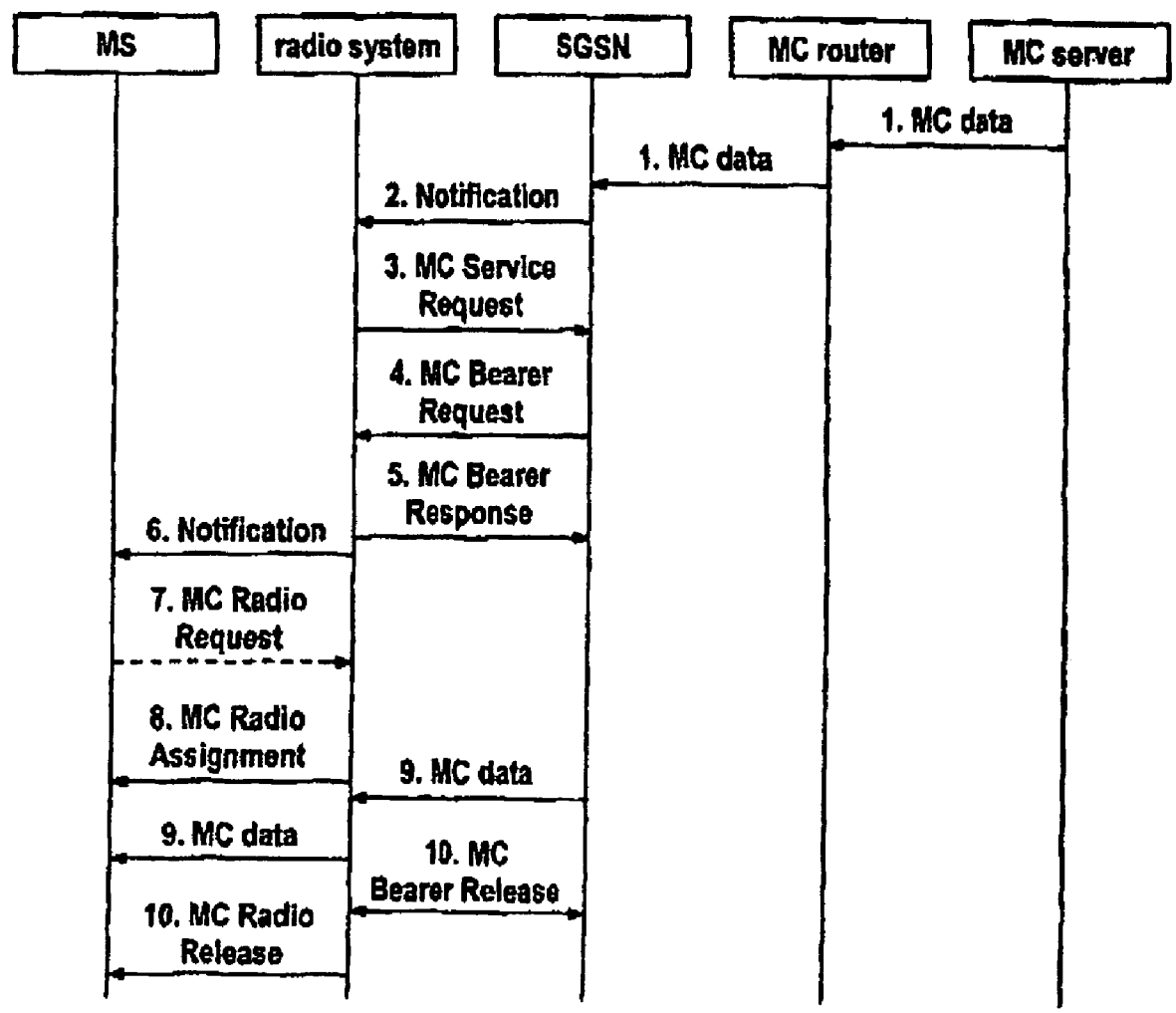
FIG. 3 shows, in the form of a block diagram, the use of methods according to the invention for the transmission of MC and/or broadcast data.

One possible MC data transfer is illustrated in FIG. 3 on the basis of a block diagram. An MC source (for example an MC server) with a specific MC IP address, which offers a specific MC service, sends MC data in a step 1, which is received by at least one SGSN with an MC context that is associated with the MC IP address. In a step 2, the SGSN then sends at least one notification to at least one radio network. This notification contains an MC-TMSI which is associated with the relevant MC service, and all the location regions in which mobile communication units MSS which have activated the relevant MC service are located. In a step 3, the radio network responds by sending one or more requests, so-called MC service requests, to the SGSN which initiate the setting up of MC transmission channels. The radio network may possibly require two or more MC transmission channels, for example for different location regions. In a step 4, the SGSN then sends an MC transmission channel request, a so-called MC Bearer Request Message, to the radio network, for each request. These requests contain the QoS parameters which the MC transmission channels between the SGSN and the MS must have. For each request from the SGSN, the radio network sends a response in a step 5, a so-called MC Bearer Response, to the SGSN, by which means an MC transmission channel is in each case set up between the radio network and the SGSN. The radio network sends notifications, indicating the MC-TMSI, to all the cells in the location regions which are predetermined by the SGSN and in which MS are located which have activated the relevant MC service. Those MS which have activated the relevant MC service and have received a notification wait for a certain time for an MC radio indication message (MC radio assignment), which describes the MC radio transmission channel via which the MC data will be transferred. If an MS does not receive any such MC radio indication message, then, in a step 7, the MS sends a request, a so-called MC radio request, to the radio network, in order to initiate the setting up of an MC radio transmission channel.

The radio network sets up one or more MC radio transmission channels and, in a step 8, sends one or more corresponding MC radio indication messages to all the relevant cells. Once the MC transmission channel or channels has or have been completely set up between the SGSN and the radio network, the SGSN starts, in a step 9, to transmit to the radio network the MC data received from the relevant IP MC address. In a step 10, the radio network then sends this MC data to the corresponding radio transmission channel/channels. If the SGSN does not receive any more MC data, then it releases the MC transmission channel or channels to the radio network, and these transmission channels are cleared in a step 11 (MC Bearer Release). This means that, in a step 12, the radio network likewise clears the corresponding radio transmission channels (MC Radio Release). This is reported to the relevant MS.

What is claimed is:

1. A method for changing the path for receiving a multicast service by a mobile communication device from a first communication node to a second communication node, the method comprising the steps of:
   transmitting a Routing Area Update Request by the mobile communication device to the second communication node;
   transmitting a Context Request by the second communication node to the first communication node;
   transmitting a Context Response by the first communication node to the second communication node, said Context Response comprising the context for said multicast service;
   transmitting a Context Acknowledgement by the second communication node to the first communication node to indicate that the second communication node has control over the mobile communication device;
   checking, by the second communication node, whether it has stored a multicast Packet Data Protocol (PDP) (MC-PDP) context for said multicast service that is indicated in the Context Response; and
   if not, creating by the second communication node a new MC-PDP context for said multicast service and entering said multicast service on a backbone network.

2. The method according to claim 1, comprising the further steps of:
   transmitting an Update Location by the second communication node to a Home Location register (HLR);
   transmitting a Cancel Location by the HLR to the first communication node;
   transmitting a Cancel Location Ack by the first communication node to the HLR;
   transmitting an Insert Subscriber Data by the HLR to the second communication node;
   transmitting an Insert Subscriber Data Ack by the second communication node to the HLR;
   transmitting an Update Location Ack by the HLR to the second communication node.

3. The method according to claim 2, comprising the further steps of:
- transmitting a Routing Area Update Accept by the second communication node to the mobile communication device;
- transmitting a Routing Area Update Complete by the mobile communication device to the second communication node.

4. The method according to claim 1, comprising the further steps of:
- transmitting a Routing Area Update Accept by the second communication node to the mobile communication device;
- transmitting a Routing Area Update Complete by the mobile communication device to the second communication node.

5. The method according to claim 1, wherein the security functions use encryption.

6. The method according to claim 1, wherein the first and second communication nodes are arranged within a mobile communication network.

7. The method according to claim 6, wherein the mobile communication network uses GPRS or UMTS.

8. A communication node, comprising:
- means for receiving a Routing Area Update Request by a mobile communication device, said request comprising an indication of another communication node presenting serving the mobile communication device;
- means for transmitting a Context Request to the other communication node;
- means for receiving a Context Response from the other communication node;
- means for transmitting a Context Acknowledgement to the other communication node to indicate that the communication node has control over the mobile communication device;
- means for checking whether the communication node has stored a multicast Packet Data Protocol (PDP) (MC-PDP) context for a multicast service that is indicated in the Context Response; and
- means for creating a new MC-PDP context for said multicast service and entering said multicast service on a backbone network if the communication node has not stored a the MC-PDP context for the multicast service.

9. The communication nodes according to claim 8, further comprising:
- means for transmitting an Update Location to a Home Location register (HLR);
- means for receiving an Insert Subscriber Data from the HLR;
- means for transmitting an Insert Subscriber Data Ack to the HLR;
- means for receiving an Update Location Ack from the HLR.

10. The communication nodes according to claim 9, further comprising:
- means for transmitting a Routing Area Update Accept to the mobile communication device;
- means for receiving a Routing Area Update Complete from the mobile communication device.

11. The communication nodes according to claim 8, further comprising:
- means for transmitting a Routing Area Update Accept to the mobile communication device;
- means for receiving a Routing Area Update Complete from the mobile communication device.

12. The communication nodes according to claim 8, wherein the security functions use encryption.

13. The communication nodes according to claim 8, wherein the communication node and the other communication node are arranged within a mobile communication network.

14. The communication nodes according to claim 8, wherein the mobile communication network uses GPRS or UMTS.

* * * * *